US012139632B2

(12) United States Patent
Uthe et al.

(10) Patent No.: US 12,139,632 B2
(45) Date of Patent: Nov. 12, 2024

(54) ROADWAY SURFACE COMPOSITIONS AND PELLETIZED BINDER MATERIALS THEREOF

(71) Applicant: Kraton Polymers LLC, Houston, TX (US)

(72) Inventors: Peter Uthe, Savannah, GA (US); David Broere, Almere (NL); Adam Fasula, Jacksonville, FL (US); Brett Neumann, Savannah, GA (US); Martine Dupont, Louvain-la-Neuve (BE)

(73) Assignee: KRATON CORPORATION, Houston, TX (US)

( * ) Notice: Subject to any disclaimer, the term of this patent is extended or adjusted under 35 U.S.C. 154(b) by 360 days.

(21) Appl. No.: 17/450,501

(22) Filed: Oct. 11, 2021

(65) Prior Publication Data

US 2022/0112394 A1 Apr. 14, 2022

Related U.S. Application Data

(60) Provisional application No. 63/198,344, filed on Oct. 12, 2020.

(51) Int. Cl.
*C09D 153/02* (2006.01)
*C09D 5/33* (2006.01)
*C09D 7/65* (2018.01)

(52) U.S. Cl.
CPC ......... *C09D 153/025* (2013.01); *C09D 5/004* (2013.01); *C09D 7/65* (2018.01)

(58) Field of Classification Search
CPC ...... C09D 153/025; C09D 5/004; C09D 7/65; C09D 193/04; C08L 53/02; C08L 53/025; E01F 9/506
See application file for complete search history.

(56) References Cited

U.S. PATENT DOCUMENTS

| 4,578,429 | A | 3/1986 | Gergen et al. |
| 5,972,421 | A | 10/1999 | Finley |
| 2003/0070579 | A1* | 4/2003 | Hong ................ C09J 7/22 106/31.04 |
| 2005/0137346 | A1* | 6/2005 | Bening ............. C08F 297/04 525/314 |

(Continued)

FOREIGN PATENT DOCUMENTS

CN 104710720 A 6/2015

OTHER PUBLICATIONS

MatWeb Datasheet—Kraton® D1102 E (SBS) Liner Block Copolymer (Year: 2023).*

*Primary Examiner* — Andrew J. Oyer
*Assistant Examiner* — Cullen L G Davidson

(57) ABSTRACT

A composition for applying onto a road surface and methods for making thereof is disclosed. The composition comprises a binder material of at least a styrenic block copolymer and a resin, which can be pelletized. The SBC is selected from a styrene-isoprene-styrene rubber (SIS) and styrene-isoprene/butadiene-styrene (SIBS); or styrene-ethylene/propylene/styrene-styrene (SEPSS), styrene-ethylene/butylene/styrene-styrene (SEBSS) and mixtures thereof. The binder can be used in road marking compositions or surface treatment compositions when combined with other components such as pigments, glass beads, anti-skid media, fillers, waxes, elastomer/plastomer, and plasticizers.

20 Claims, 1 Drawing Sheet

SBC 1   SBC 2   SBC 3   SBC 4   SBC 5   SBC 6

(56) References Cited

U.S. PATENT DOCUMENTS

2007/0065611 A1* 3/2007 Thilly .................... B65D 45/18
  524/502
2019/0055704 A1* 2/2019 Fasula .................... C09J 193/04
2020/0165458 A1* 5/2020 Colliat ............... C09D 101/284

* cited by examiner

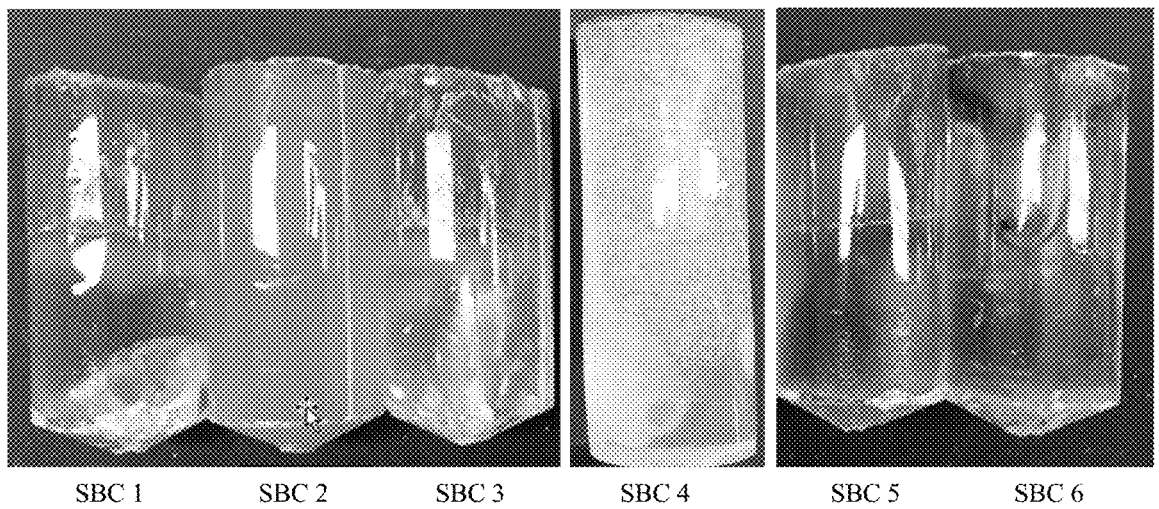
SBC 1  SBC 2  SBC 3  SBC 4  SBC 5  SBC 6

ROADWAY SURFACE COMPOSITIONS AND PELLETIZED BINDER MATERIALS THEREOF

RELATED APPLICATIONS

This application claims priority from U.S. Provisional Application No. 63/198,344, filed Oct. 12, 2020, the entire disclosure of which is incorporated herein by reference.

FIELD

The disclosure relates to a composition for applying on to a roadway surface, e.g., road marking compositions and surface treatment compositions, and in embodiments, pelletized binders made thereof.

BACKGROUND OF THE INVENTION

In the construction industry, various road marking and surface treatments are applied to impart desired characteristics to a roadway. Road surface markings, e.g., pavement markings such as sheets, paints, tapes, raised pavement markers, and individually mounted articles, guide and direct motorists and pedestrians traveling along roadways and paths. Road surface markings can be formed using mechanical, e.g., Bott's dots and rumble strips, or non-mechanical devices, e.g., formed by paint, thermoplastic, epoxy, etc.

Conventional thermoplastic road marking mix typically contains binder, plasticizer, pigments, fillers, etc. The binder is often supplied in powdered form, which makes it difficult to load into road marking machines. U.S. Pat. No. 5,972,421 discloses a method for making pelletized pavement marking mixtures to facilitate the handling of materials for use with road marking machines. US Patent Pub. No. US 2019/0055704 discloses a method for making a pelletized road marking binder system.

Surface treatments (e.g., friction-modifying coatings) typically include a binder material and aggregate, and can be applied to roadway surfaces to increase the coefficient of friction of the roadway, reducing the possibility of slippage or skidding. The binder holds the aggregate to the roadway, providing an anti-skid surface.

Binder compositions used in road marking and surface treatment applications, have been known to separate into heterogeneous mixtures. Phase separation of the binder can lead to instability of the final roadway surface composition. Specifically, for road marking applications, the separation of the molten road marking composition can result in difficulties for the contractor during application such as glass bead settling, melt viscosity drifting, etc.

There is still a need for improved materials and compositions for use in road marking and surface treatments applications.

SUMMARY

A road surface composition for applying on to a roadway is disclosed. The road surface composition comprises, consists essentially of, or consists of a styrenic block copolymer (SBC), a tackifier resin, and at least one other component. The SBC is present in the road surface composition in an amount of 0.1-20 wt. %, and has a general formula configuration selected from at least one of A-B-A, $(A-B-A)_n X$, and $(A_1-B)_d X-_e(B-A_2)$, where X is a residue of a coupling agent and n is 2-30, d is 1-30, and e is 1-30. Block A, $A_1$, $A_2$ is selected from an unhydrogenated or hydrogenated mono alkenyl arene polymer block having a peak number average molecular weight of 3,000-60,000 g/mol. Block B is a rubber block having a peak number average molecular weight of 20,000-300,000 g/mol, comprising polymerized units derived from at least one of the following: isoprene or isoprene/butadiene, and a partially hydrogenated or fully hydrogenated copolymer block of at least one conjugated diene and at least one mono alkenyl arene. The SBC has a total polystyrene content (PSC) of >28%. The tackifier resin in present in the road surface composition in an amount of 1-30 wt. %, and is selected from hydrocarbon resins, rosin resins, rosin esters, alkyd resins, and combinations thereof. The at least one other component are selected from pigments in an amount of up to 15 wt. %, glass beads in an amount of up to 50 wt. %, anti-skid media in an amount of up to 85 wt. %, fillers/aggregates in an amount of up to 60 wt. %, waxes in an amount of up to 10 wt. %, elastomer/plastomer component in an amount of up to 30 wt. %, and plasticizers in an amount of up to 15 wt. %.

In embodiments, the SBC and the tackifier resin are combined to form a binder for subsequent adding to the at least one other component to form the road surface composition In embodiments, the binder is pelletized prior to adding other components.

DESCRIPTION OF THE DRAWINGS

FIG. 1 is a photograph illustrating phase separation characteristics of various binder compositions.

DESCRIPTION

The following terms will be used throughout the specification and will have the following meanings.

"At least one of [a group such as A, B, and C]" or "any of [a group such as A, B, and C]" or "selected from [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and B means A only, B only, as well as A and B.

A list of embodiments presented as "A, B, or C" is to be interpreted as including the embodiments, A only, B only, C only, "A or B," "A or C," "B or C," or "A, B, or C".

"Thermoplastic" means a polymeric or wax material that has the property of softening or melting, and becoming pliable when heated and of hardening and becoming rigid again when cooled.

"Roadway" or "Transportation surface" refers to a surface to which the road marking compositions can be applied, including for example, aircraft runways and taxiways, roadways, walkways, bicycle paths, curbs, traffic barriers, barricades, steps, parking lots, metallic surfaces, oil rig decks, roofs, warehouse floors, and transportation-related horizontal, inclined or vertical surfaces. The surface can be concrete, asphalt or tile based.

"Pavement" means all possible transportation surfaces.

"Road marking" is used interchangeably with "pavement marking," means the application of a marking composition to a pavement.

"Pelletized binder," or "pelletized material," or "pellet binder system," or "binder system," may be used interchangeably and refers to the binder composition in pelletized form.

"Binder composition," "binder material," or "binder mixture" refers to binder composition containing at least a SBC and resin.

"Mono alkenyl arene," "vinyl aromatic," and "styrene" may be used interchangeably.

"Molecular weight" or MW refers to the styrene equivalent molecular weight in g/mol of a polymer block or a block copolymer. MW can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace- and are commonly referred to as styrene equivalent "peak molecular weights," or denoted as $MW_p$.

"Diblock content" and "styrene/rubber weight ratio" are provided as related to SBC polymer fraction.

"Polystyrene content" or "PSC" of a block copolymer refers to the % weight of vinyl aromatic, e.g., polystyrene in the block copolymer, calculated by dividing the sum of molecular weight of all vinyl aromatic blocks by the total molecular weight of the block copolymer. PSC can be determined using any suitable methodology such as proton nuclear magnetic resonance (pNMR).

"Random distribution" means that the distribution of monomers from one end of the block to the other end is roughly uniform (e.g., it is a statistical distribution based on the relative concentrations of the monomers).

"Blocked distribution" means that the distribution is a nonuniform distribution in which the A monomers (or in the alternative the B monomers) are more likely to be grouped with other A monomers (or in the case of the B monomers, with other B monomers) than is found in a statistical (i.e., "random") distribution thereby resulting in a short "defined" monomer block.

"Tapered distribution" means that the distribution is a nonuniform distribution in which the concentration of A monomer (or in the alternative, B monomer) at one end of the block is greater than at the other end of the block (it gradually declines from one end of the block to the other end of the block).

"Controlled distribution" means that the molecular structure of the controlled distribution block copolymer has the following attributes: (1) terminal regions adjacent to the mono alkenyl arene homopolymer ("A") blocks that are rich in conjugated diene units; (2) one or more regions not adjacent to the A blocks that are rich in mono alkenyl arene units; and (3) an overall structure having relatively low mono alkenyl arene blockiness.

"Rich in" is defined as greater than the average amount, e.g., a value of >105% of the average amount.

"Tsp" (softening point) is determined by ASTM E28, ASTM 218, ring and ball, or ring and cup softening point tests.

"Phase Separation Test" refers to testing a composition containing a SBC and a tackifier resin, with a ratio of 15:85 wt. % respectively, for phase separation. In the test, 60 grams of SBC and tackifier resin mixture is melted and poured into a 100 ml tube (2 cm in diameter, 10 cm in length). The sample is aged for 6 hours at 200° C. After aging, a 1 cm sample is sliced from the top and the bottom of the aged composition. The sample is analyzed by GPC using polystyrene standards to obtain the percentage of SBC in each sample. The phase separation is determined by comparing the percentage of SBC and resin in the top sample versus the SBC and resin in the bottom sample. The phase separation ratio is calculated by taking the amount of SBC in the top sample and dividing by the percentage of SBC in the bottom sample. For example, the top sample shows 50% SBC and 50% resin and the bottom shows 5% SBC and 95% resin, there is phase separation with a phase separation ratio of 10 (5:50). If both the top and bottom samples show 15% SBC and 85% resin, there is no phase separation with a phase separation ratio of 1 (15:15).

This disclosure relates to a roadway surface composition comprising a binder material having at least a styrenic block copolymer with a high styrene content and a tackifier resin for applying onto a roadway, as road marking, high friction surface treatment, etc.

Styrenic Block Copolymer Component: The styrenic block copolymer (SBC) includes, but are not limited, to unsaturated SBC such as styrene-isoprene-styrene rubber (SIS) and styrene-isoprene/butadiene-styrene (SIBS); or styrene-ethylene/propylene/styrene-styrene (SEPSS), styrene-ethylene/butylene/styrene-styrene (SEBSS) and mixtures thereof.

In embodiments, the SBC is a block copolymer composition having at least two A blocks and at least one B block. In embodiments, the SBC is a block copolymer having a general formula configuration of A-B-A, $(A-B)_nX$, $(A-B-A)_n$ X $(A_1-B)_dX-_e(B-A_2)$. X is the residue of a coupling agent and n is from 2-30, d is 1-30, and e is 1-30.

Each A, $A_1$, or $A_2$ block is independently selected from mono alkenyl arene polymer blocks and is either unhydrogenated or hydrogenated.

Each B block is a rubber block comprising polymerized units derived from at least one of the following: isoprene or isoprene/butadiene, and a partially hydrogenated or fully hydrogenated copolymer block of at least one conjugated diene and at least one mono alkenyl arene.

Each A block has a peak number average molecular weight of 3,000-60,000, or 5,000-45,000 g/mol. In embodiments, the molecular weight of $A_1$ and $A_2$ blocks differ by at least 20%.

Each B block has a peak number average molecular weight of 20,000-300,000 g/mol, or 30,000-275,000 g/mol, or 35,000-250,000 g/mol, or >25,000 or <300,000 g/mol.

In embodiments, the SBC has a diblock content of 1-6 wt. %, or 3-50 wt. %, or 1-45 wt. %, or 1-40 wt. % or <40 wt. %.

The total amount of polystyrene content in the SBC is >28 wt. %, or >30 wt. %, or >40% by wt. %, or greater than 43% by wt. %, or 28-80 wt. %, or 28-70 wt. %, or 30-60 wt. %, or <80 wt. %.

In embodiments, the SBC has a particle size of >500 μm, or >1000 μm, or >1500 μm, or >2,000 μm, or >2500 μm, or 1-10 mm, or 1.5-8 mm, or 2-5 mm.

In embodiments, the SBC is a SEPSS or SEBSS polymer, having a wt. % of mono alkenyl arene in each B block of 5-75 wt. %, or 10-70 wt. %, or 15-60 wt. %.

In embodiments, the SBC is SEBSS polymer, the B block has a vinyl content of 20-80 mol %, or 20-75 mol %, or 25-80 mol %.

In embodiments, the SBC is a SEPSS or a SEBSS, each B block is independently selected from (1) polymer blocks having at least one conjugated diene and at least one mono alkenyl arene and having a random distribution; (2) polymer blocks having at least one conjugated diene and at least one mono alkenyl arene and having a blocked distribution; (3) polymer blocks having at least one conjugated diene and at least one mono alkenyl arene and having a tapered distribution; and (4) polymer blocks having at least one conjugated diene and at least one mono alkenyl arene and having a controlled distribution. Further, the mono alkenyl arenes utilized in the A and B blocks of the block copolymers are independently selected from styrene, alpha-methylstyrene, para-methylstyrene, vinyl toluene, vinylnaphthalene, and para-butyl styrene or mixtures thereof.

In embodiments, the SBC is a SIS or SIBS block copolymer, the A block has a $MW_p$ of 10,000-20,000 g/mol, or 12,000-18,000 g/mol, and an overall $MW_p$ of 80,000-250,000 g/mol.

The SBC can be functionalized (grafted) with the incorporation of functional groups into the base polymer, e.g., epoxy, acrylates, polydimethylsiloxane (PDMS), and silanes, etc. In embodiments, the functional groups are selected from monomers capable of reacting with the base polymer, for example, in solution or in the melt by free radical mechanisms. Monomers may be polymerizable or nonpolymerizable. Preferred monomers are nonpolymerizable or slowly polymerizing.

In embodiments, the monomers for functionalization have one or more functional groups or their derivatives, e.g., carboxylic acid groups and their salts, anhydrides, esters, imide groups, amide groups, epoxy groups, acid chlorides and the like in addition to at least one point of unsaturation. Examples include but not limited to maleic acid, maleic anhydride, maleic acid esters, maleic acid amides, maleic acid imides, fumaric acid, fumaric acid esters, fumaric acid amides, fumaric acid imides, itaconic acid, itaconic anhydride, itaconic acid esters, itaconic acid amides, itaconic acid imides, and mixtures thereof.

The functionalities can be subsequently reacted with other modifying materials to produce new functional groups. For example, a graft of an acid-containing monomer can be suitably modified by esterifying the resulting acid groups in the graft with appropriate reaction with hydroxy-containing compounds of varying carbon atoms lengths. The reaction can take place simultaneously with the grafting or in a subsequent post modification reaction.

In embodiments of surface treatment applications, the SBC is present in an amount of 0.1-20 wt. %, 0.25-15 wt. %, or 0.5-10 wt. %, or 0.5-7 wt. %, or 0.5-5 wt. % of the surface treatment composition as applied onto the pavement.

In embodiments of road marking, the SBC is present in an amount of 0.1-20 wt. %, 0.25-15 wt. %, or 0.5-10 wt. %, or 0.5-7 wt. %, or 0.5-5 wt. % of the road marking composition as applied onto the pavement.

In embodiments, when used in a binder material for subsequent use in a roadway surface composition, the SBC is present in an amount of 0.1-70 wt. %, or 0.5-70 wt. %, or 1-65 wt. %, or 2-60 wt. %, or 3-55 wt. %, or 4-50 wt. %, or 5-35% wt. %, 5-25 wt. %, or 5-15 wt. %, or <70 wt. %, or <60 wt. %, or <50 wt. % of the binder material.

Tackifier Resin Component: The tackifier resin can be based on hydrocarbon resins, alkyd resins, rosin resins, rosin esters, and combinations thereof.

Materials produced using hydrocarbon based resins are typically used in long-line or longitudinal applications, whereas alkyd formulations can be used in any application. Alkyd based thermoplastic binders typically comprise of one or more member selected from the group consisting of rosin resins, rosin esters and derivatives. In embodiments, the alkyd resin is selected from maleated rosin, fumarated rosin, acrylated rosin, amidated rosin, nitrated rosin, chlorinated rosin, brominated rosin, and mixtures thereof.

In embodiments, the resin is a rosin resin, e.g, a modified rosin resin or a rosin ester. Modified rosin resins comprise one or more component selected from the group of rosin acids, maleic anhydride or fumaric acid or maleic modified rosin esters (MMRE). Rosin acids, derived from trees as gum rosin, wood rosin, or tall oil rosin, comprise one or more component selected from the group of abietic acid, neoabietic acid, dehydroabietic acid, levopimaric acid, pimaric acid, palustric acid, isopimaric acid, and sandaropimaric acid. Rosin esters comprise one or more derivatives obtained from a reaction of one or more rosin acids and one or more alcohol from the group of alcohols consisting of methanol, triethylene glycol, glycerol, and pentaerythritol. In embodiments, the rosin ester has a softening point of between 80° C. and 150° C.

In embodiments, the resin is selected from hydrogenated hydrocarbon rosin esters, acrylic rosin esters, disproportionation rosin esters, dibasic acid modified rosin esters, polymerized resin esters, phenolic modified rosin ester resins, and mixtures thereof. In embodiments, the binder comprises a mixture of maleic modified glycerol ester and pentaerythritol ester of rosin resins.

In embodiments, the resin is a hydrocarbon resin, e.g., C5 aliphatic hydrocarbon resins, C9 aromatic hydrocarbon resins, C5/C9 hydrocarbon blend, and saturated resins made from hydrogenation of these hydrocarbon resin. C5 aliphatic hydrocarbon resins are produced from distillation reactions in the presence of a Lewis catalyst, of piperylene which comprises one or more components of the group of trans-1,3-pentadiene, cis-1,3-pentadiene, 2-methyl-2-butene, dicyclopentadiene, cyclopentadiene, and cyclopentene. C9 aromatic hydrocarbon resins are a byproduct of naptha cracking of petroleum feedstocks used to produce C5 aliphatic resins, comprising one or more components of the group consisting of vinyltoluenes, dicyclopentadiene, indene, methylstyrene, styrene, and methylindenes. The hydrocarbon resins may be hydrogenated or unhydrogenated.

In embodiments of surface treatment applications, the tackifier resin is present in an amount of 1-30 wt. %, 1-25 wt. %, or 5-20 wt. %, or <30 wt. %, or >1, of the surface treatment composition as applied onto the pavement.

In embodiments of road marking, the tackifier resin is present in an amount of 1-30 wt. %, 1-25 wt. %, or 5-20 wt. %, or <30 wt. %, or >1 of the road marking composition as applied onto the pavement.

In embodiments, when used in a binder material for subsequent use in a roadway surface composition, the tackifier resin is present in an amount of 20-99.9 wt. %, 20-96 wt. %, or 20-90 wt. %, or 30-90 wt. %, or 40-90 wt. %, or >20 wt. %, or <95 wt. % of the binder material.

Optional Elastomer/Plastomer Component: In embodiments, in addition to the SBC, other elastomers can optionally be added. Examples of elastomers include but are not limited to natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), ethyl vinyl acetate (EVA), graft copolymers of EVA with another monomer such as vinyl chloride, a hot melt polyamide resin, and mixtures thereof.

In embodiments of surface treatment applications, the elastomer/plastomer is present in an amount of 0-30 wt. %, or 0.1-30 wt. %, or 0.25-25 wt. %, or 0.5-15 wt. %, or 0.5-7 wt. %, or 0.5-5 wt. %, or >2 wt. % of the surface treatment composition as applied onto the pavement.

In embodiments of road marking, the elastomer/plastomer is present in an amount of 0-20 wt. %, or 0.1-20 wt. %, or 0.5-10 wt. %, or 1-10 wt. %, or 1-9 wt. %, or 2-8 wt. %, 0.5-5 wt. %, or <20 wt. %, or <10 wt. %, or >0.5 wt. % of the road marking composition as applied onto the pavement.

In embodiments, when used in a binder material for subsequent use in a roadway surface composition, the elastomer/plastomer is present in an amount of 0-70 wt. %, 0.1-70 wt. %, 1-70 wt. %, or 5-65 wt. %, or 5-60 wt. %, or 5-55 wt. %, or 5-50 wt. %, or 5-40% wt. %, 5-35 wt. %, or 10-20 wt. %, or <70 wt. % of the binder material.

Optional Plasticizer Component: In embodiments, the roadway surface composition or binder system further comprises at least a plasticizer, selected from selected vegetable oils, process oils, mineral oils, phthalates and mixtures thereof.

Process oils comprise one or more components selected from paraffinic oils, naphthenic oils, and aromatic oils. Paraffinic oils are saturated carbon backbones, naphthenic oils have polyunsaturated carbon structure with little aromatic content, and aromatic oils have cyclic carbon unsaturation resulting aromatic classification. Phthalates comprise one or more components selected from the group of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononyl phthalate, di(2-prpoylheptyl) phthalate, diisodecyl phthalate, diundecyl phthalate, diisoundecyl phthalate, ditridecyl phthalate, and diisotridecyl phthalate.

Vegetable oils, called triglycerides because they are the resultant reaction of fatty acids with glycerol, and synthetic alkyd oils are made of fatty acid esters of varying composition. The fatty acids comprise one or more components selected from ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. Phthalates comprise one or more components selected from dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononyl phthalate, di(2-prpoylheptyl) phthalate, diisodecyl phthalate, diundecyl phthalate, diisoundecyl phthalate, ditridecyl phthalate, and diisotridecyl phthalate.

In embodiments of surface treatment applications, the optional plasticizer component is present in an amount of 0-15 wt. %, or 0.1-15 wt. %, or 1-10 wt. %, or 1-9 wt. %, or 2-8 wt. %, or >0.1 wt. % or <15 wt. % of the surface treatment composition as applied onto the pavement.

In embodiments of road marking, the optional plasticizer is present in an amount of 0-10 wt. %, or 0.1-10 wt. %, or 0.5-10 wt. %, or 1-9 wt. %, or 2-8 wt. %, 1-3 wt. %, or >0.1 wt. %, or <10 wt. % of the road marking composition as applied onto the pavement.

In embodiments when used in a binder material for subsequent use in a roadway surface composition, the optional plasticizer is present in an amount of 0-20 wt. %, 1-20 wt. %, 1-10 wt. %, or 1-8 wt. %, 1-5 wt. %, or 1-3 wt. %, or <20 wt. %, or >1 wt. % of the binder material.

Optional Waxes: Waxes can be added to the dry mixes comprising the binder materials at the application site. In other embodiment, the waxes are added to the blend of SBC and tackifier resin, forming the binder material.

The waxes can be any of vegetable waxes, including hydrogenated and partially hydrogenated vegetable oil and castor oil, petroleum derived waxes, and synthetic waxes. Vegetable waxes used in thermoplastics are normally naturally occurring mixtures of long-chain aliphatic hydrocarbons, containing esters of fatty acids and alcohols. The fatty acids comprise any of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. The alcohols are selected from glycerol, ethanol, methanol, pentaerythritol, iso-propanol, isopropyl alcohol, butanol, dihydroxy butanol, or any other mono-functional or multi-functional alcohol having a varying long-chain aliphatic hydrocarbon backbone.

Petroleum derived waxes comprise one or more members selected from the group of saturated n-alkanes, iso-alkanes, napthenes, alkyl-substituted aromatic compounds, and napthene-substituted aromatic compounds. Synthetic waxes can be polyethylene, Fischer-Tropsch waxes, chemically modified waxes, or amide modified waxes. Polyethylene waxes generally have the chemical formula $(C_2H_4)_nH_2$ and are comprised, based on branching and chemical structure, of one or more component of the group consisting of ultra-high-molecular-weight polyethylene (UHMWPE), high-density polyethylene (HDPE), cross-linked polyethylene (PEX or XLPE), medium-density polyethylene (MDPE), linear low-density polyethylene (LLDPE), low-density polyethylene (LDPE), very-low-density polyethylene (VLDPE), and copolymers. Fischer-Tropsch waxes generally have the chemical formula $(C_nH_{(2n+2)})$.

In surface treatment applications, the optional wax is present in an amount of 0-10 wt. %, or 1-10 wt. %, or 1-9 wt. %, or 2-8 wt. % of the surface treatment composition as applied onto the pavement.

In road marking applications, the optional wax is present in an amount of 0-10 wt. %, or 1-10 wt. %, or 1-9 wt. %, or 2-8 wt. % of the road marking composition as applied onto the pavement.

For use in a binder material, the optional wax is present in an amount of 0-20 wt. %, or 1-20 wt. %, or at least 2 wt. % of the binder material.

Optional Pigments: In embodiments, pigments are added to the marking materials at the application site. In embodiments, the pigments are added to the blend of SBC and tackifier resin, then extruded forming pelletized road marking materials.

The pigment for white materials is predominately Type II rutile titanium dioxide. The pigment for yellow materials is an organic based yellow pigment which can be a combination of yellow and red or orange pigments designed to withstand high temperatures and provide UV resistance and weatherability. The pigment can be Rutile Type II titanium dioxide with a minimum purity of 92% for white materials, and a combination of titanium dioxide and organic or other heavy metals free yellow pigments for yellow materials.

The amount of pigments in a binder material for subsequent use in a roadway surface composition, or in a road marking composition, or in a surface treatment application can range from 0-15 wt. %.

Optional Anti-Skid Media: In embodiments, it may be desirable for the composition to include friction and skid resistant properties, on a roadway, floor, etc. The composition further includes at least an anti-skid media/agent. Examples include but are not limited to calcined bauxite, flint, granite, steel slag or combinations thereof, one or more minerals, rocks, metals, metal oxides, hydrates, salts, silicates, plastics, polymers, glasses, halides, sulfides, phosphates, carbonates, carbon oxides, ores, and/or the like.

For road marking compositions, the anti-skid media/agent is present in an amount of up to 40 wt. %, or 1-40 wt. %, or 5-35 wt. %, or <30 wt. %

For surface friction compositions, the amount of anti-skid media/agent is present in an amount of up to 85 wt. %, or 1-80 wt. %, or 5-70 wt. %, or 10-60 wt. %, or >10 wt. %

Optional Glass beads: In embodiments, glass beads are incorporated into the material so that as the material degrades under UV, water, and traffic exposure, the glass beads will become exposed and serve as reflective elements for nighttime visibility while under illumination from vehicles' headlamps.

In embodiments, the marking material includes microcrystalline ceramic beads for high refractive index quality, for a durable optics system that returns more light to drivers than typical glass beads. Certain embodiments of the microcrystalline bead structure and elements include rare earth elements, with some materials having glow in the dark attributes that improve safety for drivers.

In embodiments, the marking composition includes fluorescent and/or phosphorescent material. The luminescent material can be any suitable luminescent material e.g., a mixture of copper sulphide (CuS) and zinc sulphide (ZnS).

The amount of glass beads in a road marking composition as applied onto the pavement can range up to 50 wt. %, or from 25-50 wt. %.

Optional Fillers/Aggregates: Fillers and/or aggregates are used to extend the thermoplastic resin, and confer some special properties on the eventual marking. Fillers can be added at the production site to the binder material, or in some embodiments, fillers can be optionally added to form the pelletized binder system.

In embodiments, fillers are ground calcium carbonate of various particle size based on desired flow characteristics. In other embodiments, fillers comprise glass beads/microbeads selected based on size, quality, and concentration specified by the applicable governmental requirement. In yet other embodiments, fillers are any of sand, mica, cracked stone, calcined flint, quartate or crushed marble, and mixtures thereof.

In embodiments of surface treatment applications, the optional fillers/aggregates is present in an amount of 0-60 wt. %, or 0.05-60 wt. %, or 0.1-50 wt. %, or 2-40 wt. %, or 5-30 wt. %, or 5-20 wt. %, or at least 0.1 wt % of the surface treatment composition as applied onto the pavement.

In embodiments of road marking, the optional filler/aggregates is present in an amount of 0-50 wt. %, or 25-50 wt. % of the road marking composition as applied onto the pavement.

Properties: The binder material is a mixture of a SBC and tackifier resin is used in compositions for applying to roadway surfaces, e.g., high friction surface treatment, or road marking, by combining with other materials including, waxes, pigments, fillers, and other optional components.

In embodiments, the binder composition comprising, consisting essentially of, or consisting, of a SBC and tackifier resin is characterized as having a phase separation (homogeneity) ratio in the range of <5, or <4, or <3, preferably 0.4-2, or 0.5-1.5, or 0.5-1, or 0.75-1, or >0.5 or <2 or <1.8, in a Phase Separation Test.

In embodiments, the binder composition when heated to 200° C. has a viscosity of at least 100 mPa·s, or of at least 250 mPa·s, or of at least 500 mPa·s, and has a $T_{sp}$ of at least 85° C., or >95° C., or >100° C., or >125° C., or >150° C., or 80° C.-200° C. In embodiments, the binder composition comprising a SBC and a tackifier resin has an acid number of less than 50, or <40, or <30, or <20.

In embodiments, the binder is pelletized into pellet form before being added to the other additional components of road marking or surface treatment compositions. The use of a two-component pelletized binder (e.g., a SBC and tackifier resin) or a three-component pelletized binder (e.g., SBC, tackifier resin and pigment) in conjunction with other materials such as fillers, glass beads, etc., results in a reduction in preparation time (heating/melting/and extrusion) of at least 15% over an application with all the ingredients being added, heated, melted and mixed together as is.

Method for Making: In embodiments, the binder material components, e.g., SBC and tackifier resin, are combined together at a sufficiently high temperature (e.g., at least 150° C., or 180° C.) to form the binder. In other embodiments, the binder material is pelletized by a variety of methods to form a binder in pellet form. The mixing, melting, and pellet forming can be done by methods known in the art, e.g., hot melt extrusion.

In embodiments, the composition for applying onto a road surface comprises the binder material in an amount of 5-30 wt. %, or 10-30 wt. % or 20-30 wt. % based on the total weight of the road surface composition, and one or more of the optional components, which are combined together. In embodiments, the components (e.g., binder material components and one or more of the optional components) can then be then pelletized by a variety of methods.

The exact method used to pelletize the extruded, binder material or road surface material depends on the types and characteristics of the components used in forming the pellets. For example, pelletization methods commonly known as granulation or briquetting, extrusion, extrusion agglomeration, and mixing agglomeration can be used to pelletize the binder material and/or road surface material. In embodiments, when extrusion agglomeration is used, the road surface material can be pelletized directly from the reaction vessel.

In embodiments, the molten components are first mixed together in a reactor to form a mixture, then fed into an extruder forming strands, which are subsequently cut into pellets or are fed onto a pelletizing belt through pumping the hot liquid into a cylindrical stator whereby the liquid is pushed through a perforated shell onto the cooling belt. In embodiments, after the pellets are formed, they are coated with an adhesion inhibiting agent to remove/reduce clumping during storage and transit. Examples of adhesion inhibiting agents include but are not limited to talc, chalk, and silica.

The pellets can differ in size, pigment, as well as refractive index depending on the type and ratio of components in the raw material mix. In embodiments, the pellets are of the size that is not too large, e.g., <50 cm$^3$. In another embodiment, at least 75% of the pellets are formed to have a volume of <25 cm$^3$. In a third embodiment, at least 90% of the pellets have a volume of 0.125-4 cm$^3$.

The pelletized binder material is packaged in bags and shipped to a road marking manufacturer, where a finished dry mix road marking composition is produced. The finished dry mix road marking is then transported to the job side to be applied onto the road.

EXAMPLES: The following illustrative examples are non-limiting. A description of the SBC and tackifier resin components are as follows.

SBC 1 is a linear triblock copolymer based on styrene and isoprene with a styrene/rubber weight ratio of 15/85, and a diblock content of 19%.

SBC 2 is a linear triblock copolymer based on styrene and isoprene with a styrene/rubber weight ratio of 44/56, and a diblock content of <1%.

SBC 3 is a linear triblock copolymer based on styrene and isoprene, with a styrene/rubber weight ratio of 15/85, and a diblock content of 38%.

SBC 4 is a linear triblock copolymer based on styrene and ethylene/butylene with a styrene/rubber weight ratio of 58/42, and a diblock content of <1.

SBC 5 is a linear triblock copolymer based on styrene and isoprene with a styrene/rubber weight ratio of 19/81, and a diblock content of <1%.

SBC 6 is a radial triblock copolymer based on styrene and isoprene, with a styrene/rubber weight ratio of 28/72, and a diblock content of 30%.

Resin 1 is a modified rosin ester with a softening point of 107° C., a glass transition temperature of 63° C., a flash point >250° C., a Gardner color of 4, and an acid value of 38.

Resin 2 is a modified rosin ester with a softening point of 98° C., a glass transition temperature of 48° C., Gardner color of 4, and an acid value of 10.

Examples 1-8: In the examples 1-8 (Table 2) the road marking composition is formed by heating the components to 200° C. or 392° F. for a 1-2 hour period to obtain a homogenous mixture.

Examples 9-16: The pre-blend pellets of examples 1-3 in Table 3, are used to form pavement marking mixtures for examples 9-11 (i.e., example 1 pellets are used to form marking composition in example 9, example 2 pellets are used in example 10, etc.). In all examples, the mixture of pellets and additional components are heated to at least 180° C. to obtain a homogenous composition, before application to a surface.

TABLE 2

| Example (wt %) | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| EVA | 8.0 | — | — | — | — | — | — | — | 1.0 | — | — | — | — | — | — | — |
| SBC 1 | — | 8.0 | 8.0 | — | — | — | — | — | — | 1.0 | 1.0 | — | — | — | — | — |
| SBC 2 | — | — | — | 8.0 | — | — | — | — | — | — | — | 1.0 | — | — | — | — |
| SBC 3 | — | — | — | — | 8.0 | — | — | — | — | — | — | — | 1.0 | — | — | — |
| SBC 4 | — | — | — | — | — | 8.0 | — | — | — | — | — | — | — | 1.0 | — | — |
| SBC 5 | — | — | — | — | — | — | 8.0 | — | — | — | — | — | — | — | 1.0 | — |
| SBC 6 | — | — | — | — | — | — | — | 8.0 | — | — | — | — | — | — | — | 1.0 |
| Resin 1 | 47 | 47 | 30 | 47 | 47 | 47 | 47 | 47 | 16 | 16 | 10 | 16 | 16 | 16 | 16 | 16 |
| Resin 2 | — | — | 17 | — | — | — | — | — | — | — | 6 | — | — | — | — | — |
| Wax | — | — | — | — | — | — | — | — | — | — | — | — | — | — | — | — |
| Plasticizer | — | — | — | — | — | — | — | — | 2 | 2 | 2 | 2 | 2 | 2 | 2 | 2 |
| Pigment (TiO$_2$) | 10 | 10 | 10 | 10 | 10 | 10 | 10 | 10 | 10 | 10 | 10 | 10 | 10 | 10 | 10 | 10 |
| Filler | — | — | — | — | — | — | — | — | 36 | 36 | 36 | 36 | 36 | 36 | 36 | 36 |
| Glass Beads | 35 | 35 | 35 | 35 | 35 | 35 | 35 | 35 | 35 | 35 | 35 | 35 | 35 | 35 | 35 | 35 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

The road marking phase stability (homogeneity) was determined for Examples A-G as shown in Table 3. The binder material was prepared by weighing all raw materials into a 1-liter metal tin and start stirring. After charging, the metal tin is placed into a beaker heater in a fume cupboard for heating up to 180-200° C. Besides the agitator, use a knife to hand stir as well. When the solid materials turn to paste, hand stirring is not needed. Use a laser thermometer to measure the temperature. After it reaches temperature of 190° C. keep it stirring for 30 minutes before discharging into a 100 ml tube, with a 2 cm diameter and a length of 10 cm. The binder composition was aged at 200° C. for 6 hours, then solidified. After solidification, a 1 cm sample is sliced from the top and bottom which is analyzed by GPC using polystyrene standards to obtain the percentage of SBC in the sample.

The ratio of phase separation is determined by a Phase Separation Test, comparing the percentage of SBC in the top sample versus the percentage of SBC in the bottom sample. The phase separation ratio is calculated by dividing the percent of SBC in the top sample by the percent of SBC in the bottom sample e.g., (% SBC top/% SBC of bottom). A phase separation ratio of less than 5 is considered acceptable (indicated as "No" in Table 3, with values greater than 5 as "Yes"), with a ratio of 1 being preferred.

TABLE 3

| | Binder material composition | | | | | | |
|---|---|---|---|---|---|---|---|
| Example | A | B | C | D | E | F | G |
| Resin 1 | 85 | 85 | 85 | 85 | 85 | 85 | 85 |
| EVA | 15 | — | — | — | — | — | — |
| SBC 1 | — | 15 | — | — | — | — | — |
| SBC 2 | — | — | 15 | — | — | — | — |
| SBC 3 | — | — | — | 15 | — | — | — |
| SBC 5 | — | — | — | — | 15 | — | — |
| SBC 6 | — | — | — | — | — | 15 | — |
| SBC 4 | — | — | — | — | — | — | 15 |
| Total Pellet | 100.0 | 100.0 | 100.0 | 100.0 | 100.0 | 100.0 | 100.0 |
| Phase Separation Test Results | | | | | | | |
| wt. % of styrene in SBC | — | 15 | 44 | 15 | 19 | 28 | 58 |
| % polymer in binder after aging in melt (top of sample) | 15 | 31.7 | 16.3 | 30.6 | 30.7 | 18.0 | 15 |
| % polymer in binder after aging in melt (bottom of sample) | 15 | 3.2 | 15.2 | 1.2 | 0.8 | 3.7 | 15 |
| Phase Separation Ratio (top/bottom polymer in binder) | 1.0 | 9.9 | 1.1 | 25.5 | 38.4 | 4.9 | 1.0 |
| Phase Separation | No | Yes | No | Yes | Yes | No | No |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A road surface composition comprising:
0.1-3.9 wt. % of a styrenic block copolymer (SBC), the SBC has a total polystyrene content of 40-60 wt. %,
wherein the SBC has a general formula configuration selected from at least one of A-B-A, $(A-B)_n X$, $(A-B-A)_n X$, and $(A_1-B)_d X-_e (B-A_2)$, where X is a residue of a coupling agent and n is 2-30, d is 1-30, and e is 1-30;
wherein block A, $A_1$, $A_2$ is selected from an unhydrogenated or hydrogenated mono alkenyl arene polymer block having a peak number average molecular weight of 3,000-60,000 g/mol;
wherein block B is a rubber block having a peak number average molecular weight of 20,000-300,000 g/mol, comprising polymerized units derived from at least one of the following:
isoprene or isoprene/butadiene, and
a partially hydrogenated or fully hydrogenated copolymer block of at least one conjugated diene and at least one mono alkenyl arene;
1-30 wt. % of a tackifier resin selected from hydrocarbon resins, rosin resins, rosin esters, alkyd resins, and combinations thereof;
1-15 wt. % of pigments;
25-50 wt. % of glass beads;
0.05-60 wt. % of fillers/aggregates;
anti-skid media in an amount of up to 85 wt. %;
waxes in an amount of up to 10 wt. %;
elastomer/plastomer component in an amount of up to 30 wt. %; and
plasticizers in an amount of up to 15 wt. %; and
wherein the road composition is applied directly onto a road way.

2. The road surface composition of claim 1, wherein the SBC has a particle size of greater than 2500 μm.

3. The road surface composition of claim 1, wherein the SBC has a diblock content of 1-60 wt. %.

4. The road surface composition of claim 1, wherein the SBC is a styrene-ethylene/propylene/styrene-styrene (SEPSS) or styrene-ethylene/butylene/styrene-styrene (SEBSS) having a wt. % of mono alkenyl arene in each B block of 5-75 wt. %.

5. The road surface composition of claim 1, wherein the SBC is a styrene-ethylene/butylene/styrene-styrene (SEBSS) having a vinyl content of 20-80 mol %.

6. The road surface composition of claim 1, wherein the SBC is a styrene-isoprene-styrene (SIS) or styrene-isoprene/butadiene-styrene (SIBS) block copolymer having a $MW_p$ 80,000-250,000 g/mol.

7. The road surface composition of claim 1, wherein block B is at least one conjugated diene and at least one mono alkenyl arene and having a random distribution, a block distribution, a tapered distribution, or a controlled distribution.

8. The road surface composition of claim 1, wherein the SBC is functionalized with one or more functional groups.

9. The road surface composition of claim 1, the tackifier resin is a rosin ester selected from hydrogenated rosin ester, acrylic rosin ester, disproportionation rosin ester, dibasic acid modified rosin ester, polymerized resin ester, phenolic modified rosin ester resin, and mixtures thereof.

10. The road surface composition of claim 9, wherein the rosin ester has a softening point of 80° C. and 150° C.

11. The road surface composition of claim 1, wherein the alkyd resin is selected from maleated rosin, fumarated rosin, acrylated rosin, amidated rosin, nitrated rosin, chlorinated rosin, brominated rosin, and mixtures thereof.

12. The road surface composition of claim 1, wherein the hydrocarbon resin is selected from the group of C5 aliphatic hydrocarbon resins, C9 aromatic hydrocarbon resins, C5/C9 hydrocarbon blend, and saturated resins made from hydrogenation of these hydrocarbon resin.

13. The road surface composition of claim 1, wherein the elastomer/plastomer is selected from the group of natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), ethyl vinyl acetate (EVA), graft copolymers of EVA with another monomer, hot melt polyamide resin, and mixtures thereof.

14. The road surface composition of claim 1, wherein the plasticizer is selected from the group of vegetable oils, process oils, mineral oils, phthalates and mixtures thereof.

15. The road surface composition of claim 1, wherein the wax is selected from vegetable waxes, petroleum derived waxes, and synthetic waxes.

16. The road surface composition of claim 1, wherein the SBC and the tackifier resin are combined to form a binder for subsequent adding to the at least a component to form the road surface composition.

17. The road surface composition of claim 16, wherein the binder is characterized as having a phase separation ratio of 0.4-2 in a Phase Separation Test.

18. The road surface composition of claim 16, wherein the binder is pelletized prior to adding to the at least a component.

19. The road surface composition of claim 18, wherein the pelletized binder is coated with an adhesion inhibiting agent prior to adding to the at least a component.

20. The road surface composition of claim 16, wherein the binder is present in the road surface composition in an amount of 5-30 wt. %, based on the total weight of the composition.

* * * * *